(12) United States Patent
Couillard et al.

(10) Patent No.: US 6,287,403 B1
(45) Date of Patent: Sep. 11, 2001

(54) SUPPORT SYSTEM FOR ROTARY FUNCTION ROLLS

(75) Inventors: Jack Lee Couillard, Menasha; Chinmay Suresh Betrabet, Neenah; James Melvin Gaestel, Seymour; Chris Lee Heikkinen, Menasha; Daniel Hoo; Jeffery Joseph Samida, both of Appleton; Daniel James Sorensen, Neenah, all of WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 09/503,825

(22) Filed: Feb. 15, 2000

(51) Int. Cl.[7] ................................................ B29C 65/08
(52) U.S. Cl. .................... 156/73.1; 156/290; 156/308.4; 156/553; 156/555; 156/580.2; 156/582
(58) Field of Search .................... 156/73.1, 290, 156/308.2, 308.4, 553, 555, 580.1, 580.2, 582; 264/442, 443, 444

(56) References Cited

U.S. PATENT DOCUMENTS

| | | |
|---|---|---|
| 3,844,869 | 10/1974 | Rust, Jr. . |
| 3,902,236 | 9/1975 | Deem . |
| 3,942,789 | 3/1976 | Townsend . |
| 4,076,663 | 2/1978 | Masuda et al. . |
| 4,149,335 | 4/1979 | Duescher . |
| 4,286,082 | 8/1981 | Tsubakimoto et al. . |
| 4,399,639 | 8/1983 | Lessway . |
| 4,512,564 | 4/1985 | Alverth et al. . |
| 4,542,771 | 9/1985 | Payet et al. . |
| 4,619,451 | 10/1986 | Dodge . |
| 4,647,097 | 3/1987 | Lessway . |
| 4,647,100 | 3/1987 | Lessway . |
| 4,650,237 | 3/1987 | Lessway . |
| 4,701,240 | 10/1987 | Kraemer et al. . |
| 4,704,116 | 11/1987 | Enloe . |
| 4,798,603 | 1/1989 | Meyer et al. . |
| 4,975,133 | 12/1990 | Gochermann . |
| 5,058,468 | 10/1991 | Lessway . |
| 5,087,320 | 2/1992 | Neuwirth . |
| 5,096,532 | 3/1992 | Neuwirth et al. . |
| 5,110,403 | 5/1992 | Ehlert . |
| 5,142,931 | 9/1992 | Menahem . |
| 5,237,780 | 8/1993 | Lessway . |
| 5,259,306 | 11/1993 | Jenkins et al. . |
| 5,285,599 | 2/1994 | Lessway . |
| 5,421,924 | 6/1995 | Ziegelhoffer et al. . |
| 5,552,013 | * 9/1996 | Ehlert et al. ........................... 156/555 |
| 5,562,790 | * 10/1996 | Ehlert et al. ........................ 156/73.1 |
| 5,817,199 | * 10/1998 | Brennecke et al. ................. 156/73.1 |
| B1 5,147,343 | 3/1998 | Kellenberger . |

OTHER PUBLICATIONS

Arobotech Systems brochure about Auto Rest®.

* cited by examiner

*Primary Examiner*—James Sells
(74) *Attorney, Agent, or Firm*—Jeffrey B. Curtin

(57) ABSTRACT

An apparatus and method for effecting an operation on at least one moving substrate web is disclosed. The apparatus comprises a rotatable bonding roll that is located adjacent the substrate web and configured to rotate about a bonding axis. A rotatable anvil roll has an anvil surface and is configured to rotate about an anvil axis to press the substrate web against an outer peripheral bonding surface of the bonding roll thereby bonding the substrate web. At least three support wheels are configured to contact the bonding surface of the bonding roll and to hold the bonding roll in a substantially fixed position.

23 Claims, 4 Drawing Sheets

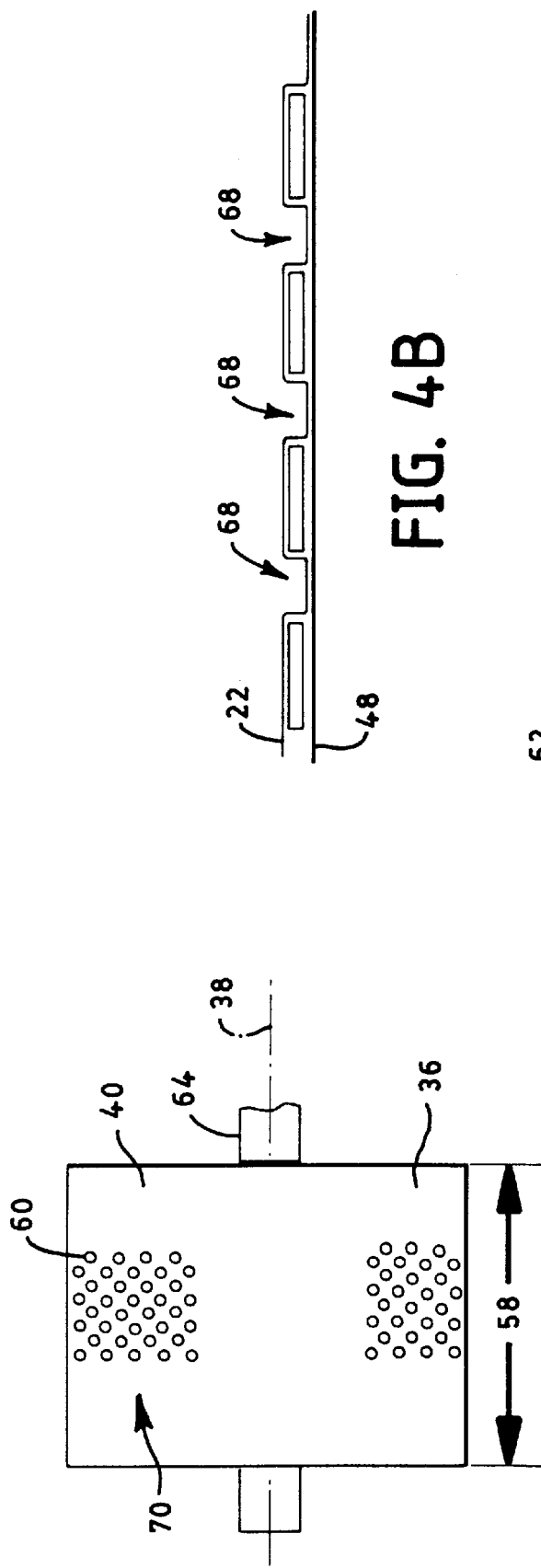

SUPPORT SYSTEM FOR ROTARY FUNCTION ROLLS

BACKGROUND OF THE INVENTION

1. Field of the Invention

The present invention relates to an apparatus and method for effecting an operation on at least one continuously moving web or piece attached to a continuously moving web using a rotating function roll. The invention more particularly concerns an apparatus and method for ultrasonically bonding at least one continuously moving web using a rotary ultrasonic horn.

2. Description of the Related Art

Several different conventional methods have existed for effecting an operation on at least one continuously moving web using a rotating function roll. Such operations have included bonding, cutting, perforating, splicing, compacting and the like which may or may not be intermittent.

For example, it has been well known to those skilled in the art to bond at least one continuously moving substrate web by constrictively passing it between a rotating bonding roll and a rotating anvil roll. Typically, the anvil roll has included a plurality of raised projections that have been configured to bond the web in a predetermined bond pattern. The substrate web has been bonded by any means known to those skilled in the art such as thermal, ultrasonic or adhesive bonding. For example, the bonding roll has been heated to thermally bond the web as the web constrictively traveled between the bonding roll and the anvil roll. Alternatively, the bonding roll has included a rotary ultrasonic horn that has been capable of transmitting ultrasonic energy to ultrasonically bond the web as it constrictively traveled between the rotary ultrasonic horn and the anvil roll. Representative examples of rotary ultrasonic horns that have been used to bond at least one web are described in commonly assigned U.S. Pat. No. 5,096,532 to Neuwirth et al. issued Mar. 17, 1992; and U.S. Pat. No. 5,110,403 to Ehlert issued May 5, 1992.

The consistency and quality of the bond when using such rotary bonding techniques is dependent upon the force exerted on the web by the anvil roll and bonding roll; the time that the web is being pressed which is dependent upon the operating speed; and the types of materials being bonded. In thermal bonding methods, the consistency and quality of the bonds has also been dependent on the temperature of the bonding roll. In ultrasonic bonding methods, the consistency and quality of the bonds has also been dependent on the frequency and amplitude of the vibrations of the ultrasonic horn.

Many of the conventional methods for rotary bonding have included a rotating bonding roll that is mounted in a cantilevered configuration such that the bonding roll is not supported about its surface. However, such conventional methods have not always been sufficiently satisfactory. The use of a cantilevered bonding roll has some inherent limitations that adversely affect the bond quality that, in turn, limits the operating speeds. When the bonding roll is mounted in a cantilevered configuration, the consistency and quality of the bond is dependent upon the runout in both the bonding roll and the anvil roll and the amount that both rolls flex when under a variable load due to the types of materials being bonded and the variable operating speeds. In such a configuration, it has been virtually impossible to maintain a proper interference between the bonding roll and the anvil roll to achieve the desired constant force between the rolls in the bond region especially as the process variables change. Thus, in many of the conventional methods for rotary bonding, the bond quality has been undesirably variable both along the length and across the width of the bond region and the process has not been as robust as desired in a manufacturing environment.

The consistency and quality of the bonds when rotary bonding using conventional methods has been particularly variable if the desired bond pattern is intermittent because it becomes increasingly difficult to maintain the constant force and contact between the bonding and anvil rolls along the entire length of the bond pattern. When using many of the conventional methods for rotary bonding in such a configuration, the bond quality has typically been less than satisfactory along the length of the bond pattern. This inconsistency has been due, at least in part, to excessive interference at the leading edge of the intermittent pattern and insufficient interference at the trailing edge of the intermittent pattern as the bonding roll flexes and deflects or bounces. Both the excessive interference and the insufficient interference have resulted in poor bond quality and consistency.

Many of the conventional methods for rotary bonding have used different approaches to diminish the extent of these limitations. For example, the bonding roll, anvil roll and support frames have been precisely machined to minimize the runout in the bonding system. In addition, the strength of the bonding and anvil rolls and their support frames has been increased to minimize the flexing under the variable load conditions. However, these approaches have been expensive and inefficient and have required extensive setup modifications as the process variables, such as operating speed, are changed.

The above-mentioned difficulties of maintaining the desired bond quality and consistency have been even more acute when ultrasonically bonding at least one continuously moving web using a rotary ultrasonic horn. The rotary ultrasonic horn has inherent movement which may adversely affect bond consistency and quality because it continuously vibrates at a given frequency and amplitude to efficiently bond the web. Because the ultrasonic horn has to vibrate at its resonant frequency like a bell it cannot be rigidly mounted. The need to provide non-rigid mounts produces deflections under load. Moreover, the rotary ultrasonic horn has usually been mounted in a cantilevered configuration that enhances the amount of flex under load.

These difficulties are even further exasperated when the rotary ultrasonic bonding includes an intermittent bond pattern as discussed above.

SUMMARY OF THE INVENTION

In response to the discussed difficulties and problems encountered in the prior art, a new method and apparatus for effecting an operation on a continuously moving web using a rotary function roll has been discovered.

In an apparatus aspect, the present invention provides a distinctive apparatus for bonding at least one continuously moving substrate web. The apparatus comprises a rotatable bonding roll that is located adjacent the substrate webs and configured to rotate about a bonding axis. The bonding roll has an outer peripheral bonding surface upon which the substrate web travels. The bonding surface is contacted by at least three support surfaces. The support surfaces are configured to hold the bonding roll in a substantially fixed position. A rotatable anvil roll having an outer peripheral anvil surface is located adjacent the bonding roll. The anvil roll is configured to rotate about an anvil axis to press the substrate webs against the bonding surface of the bonding roll thereby bonding the substrate webs together. In a particular embodiment, the bonding roll includes a rotary ultrasonic horn. In such a configuration, the apparatus also includes an ultrasonic bonding means that provides ultrasonic energy to the rotary ultrasonic horn. In another particular embodiment, the rotatable anvil roll has a plurality of projections across the anvil surface which are configured to bond the substrate web at bond locations which are arranged in a predetermined bond pattern.

A method aspect of the present invention provides a method for effecting an operation, such as ultrasonic bonding, on at least one continuously moving substrate web. At least one continuously moving substrate web is supplied along a substrate path. A rotatable function roll, such as a rotary ultrasonic horn, is provided adjacent the substrate path. The function roll is rotated about a function axis and has an outer peripheral surface upon which the substrate web travels. The peripheral surface of the function roll is contacted by at least three support surfaces. The support surfaces are configured to hold the function roll in a substantially fixed position in use. A rotatable anvil roll which has an outer peripheral anvil surface is also provided adjacent the substrate path. The anvil roll rotates about an anvil axis and presses the substrate web against the outer peripheral surface of the function roll thereby effecting an operation on the substrate web across the outer peripheral anvil surface of the anvil roll.

A particular method aspect of the present invention provides a method for intermittently ultrasonically bonding at least one continuously moving substrate web. At least one continuously moving substrate web is supplied along a substrate path. A rotary ultrasonic horn is provided adjacent the substrate path. The rotary ultrasonic horn rotates about a bonding axis and has an outer peripheral bonding surface upon which the substrate web travels. The outer peripheral bonding surface is contacted by at least three support surfaces which are configured to hold the rotary ultrasonic horn in a substantially fixed position in use. A rotatable anvil roll is also provided adjacent to the substrate path. The rotatable anvil roll rotates about an anvil axis and has an outer peripheral anvil surface. The outer peripheral anvil surface includes a plurality of projects arranged in an intermittent pattern which press the substrate web against the bonding surface of the rotary ultrasonic horn and intermittently bond the substrate web.

The present invention, in its various aspects, can advantageously provide an apparatus and method for rotary bonding which, when compared to conventional devices, can more efficiently bond at least one moving web while maintaining a substantially constant bond pattern. The apparatus and method of the present invention fixes the bonding roll in place to compensate for runout and the flex due to the variable loads thereby improving the bond quality and consistency. The apparatus of the present invention is also less expensive when compared to the conventional devices because lower precision components can be employed.

BRIEF DESCRIPTION OF THE DRAWINGS

The present invention will be more fully understood and further advantages will become apparent when reference is made to the following detailed description of the invention and the accompanying drawings. The drawings are merely representative and are not intended to limit the scope of the appended claims.

FIG. 4A representatively shows an example of an anvil roll of the apparatus of the present invention;

FIG. 4B representatively shows an example of a composite substrate web which can be manufactured using the apparatus and method of the present invention; and FIG. 4C representatively shows another example of an anvil roll of the apparatus of the present invention.

DETAILED DESCRIPTION OF THE INVENTION

The present invention provides an apparatus and method for effecting an operation on at least one continuously moving substrate web using a rotatable function roll. The apparatus and method are particularly useful for ultrasonically bonding selected components to absorbent articles using a rotary ultrasonic horn. Alternatively, the apparatus and method can be particularly useful for bonding two webs together to form a composite material and subsequently using it as a component in an absorbent article such as, for example, a disposable diaper. The present invention is particularly useful in the bonding of one or more layers of materials that preferably are made, at least in part, from thermoplastic polymers. In addition, it should be readily understood that the rotatable function roll may perform an operation in addition to or in place of the bonding such as cutting, perforating, compacting, splicing, and the like and combinations thereof.

In particular, the apparatus and method of the present invention can be used to ultrasonically bond a waistband to a disposable diaper using a rotary ultrasonic horn. The waistband enhances the fit and comfort of the diaper about the waist of the wearer. The apparatus and method of the present invention may otherwise be used to bond a fastener landing strip to the outer cover of the diaper. In addition, it should be readily understood that the apparatus and method of the present invention may be used in the manufacture of other types of articles, such as, for example, training pants, feminine care products, incontinence garments, hospital gowns and the like. All of such alternative configurations are contemplated as being within the scope of the present invention.

Figure 1:
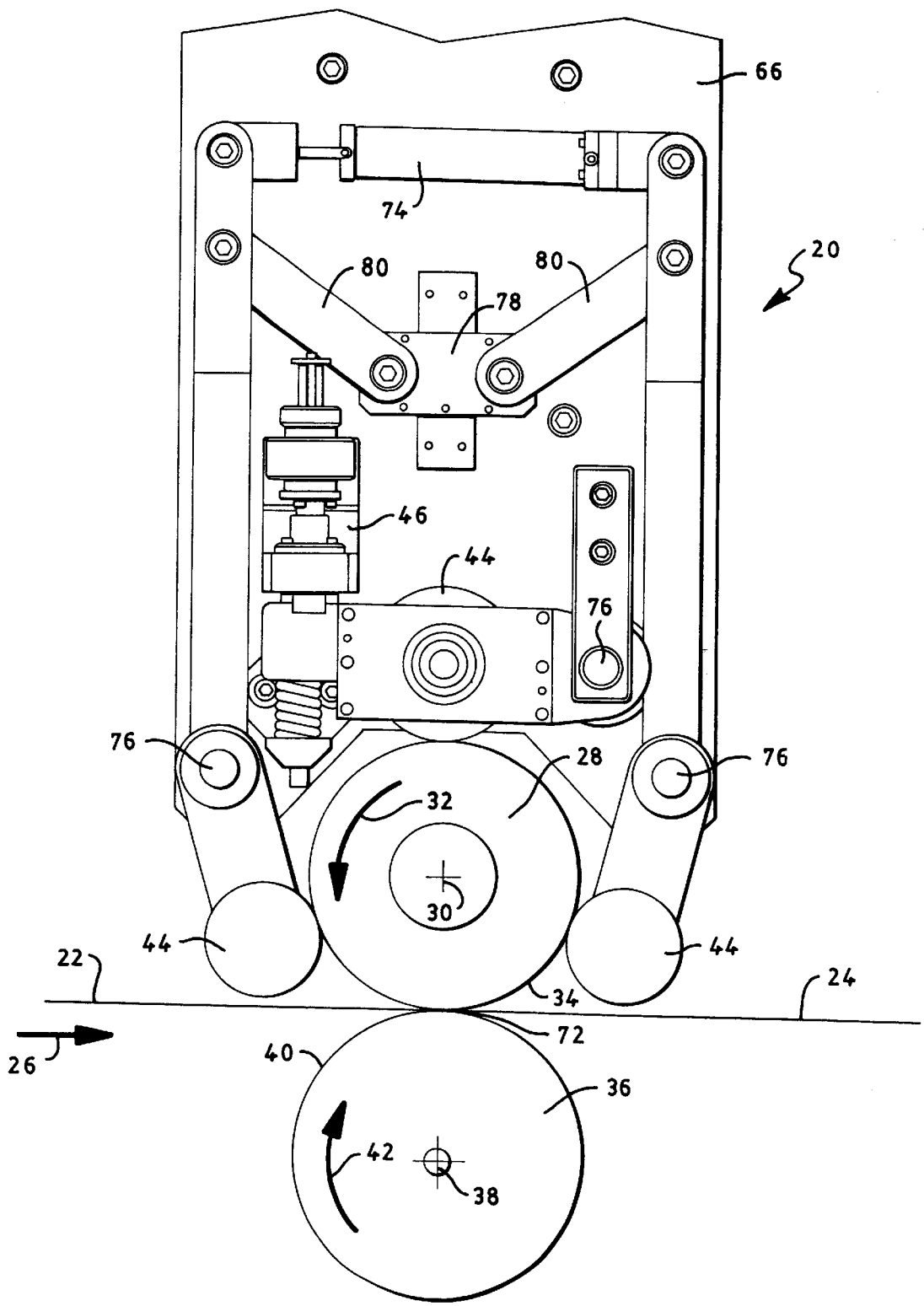
FIG. 1 representatively shows a front elevational view of one example of an apparatus of the present invention.
Figure 2:
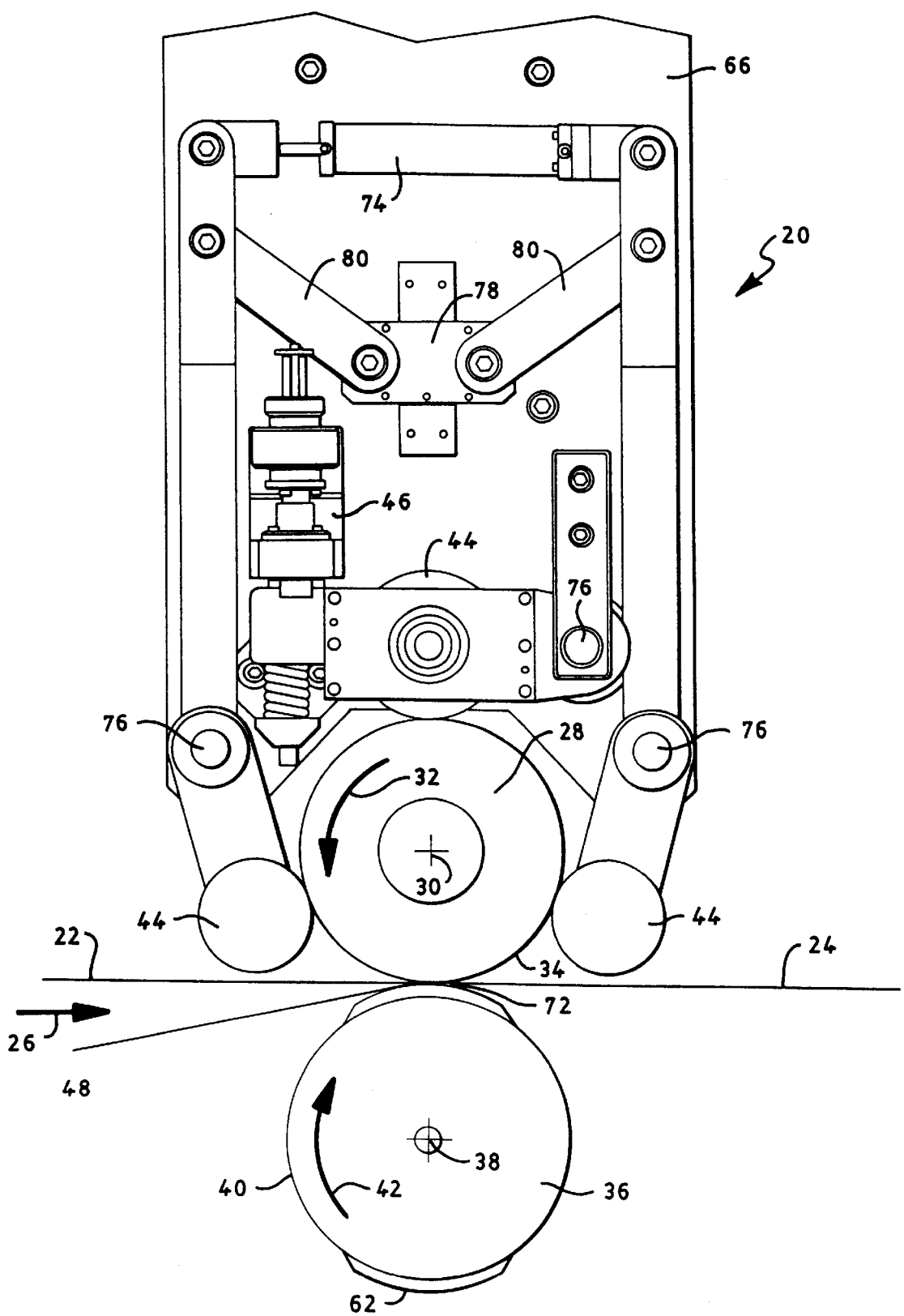
FIG. 2 representatively shows a front elevational view of another example of an apparatus of the present invention.

The apparatus and method of the present invention will be described in terms of a bonding operation using a rotary bonding roll such as a rotary ultrasonic horn. However, it should be recognized that such apparatus can be used for effecting other operations such as cutting, perforating, and the like. Referring to the Figures wherein like numerals represent like elements, two examples of apparatus for rotary bonding are representatively illustrated in FIGS. 1 and 2. The apparatus, which is generally indicated at 20, and method may be used to bond at least one continuously moving substrate web 22 as illustrated in FIG. 1 or two or more substrate webs 22 and 48 together as illustrated in FIG. 2. The substrate web 22 is continuously moving along a substrate path 24 in the direction indicated by the arrow 26 associated therewith. The apparatus 20 includes a rotatable function roll such as bonding roll 28 that is located adjacent the substrate web 22. The bonding roll 28 is configured to rotate about a bonding axis 30 in the direction indicated by the arrow 32 associated therewith. The bonding roll 28 has an outer peripheral bonding surface 34 upon which the substrate web 22 travels. A rotatable anvil roll 36 having an outer peripheral anvil surface 40 is located adjacent the bonding roll 28. The anvil roll 36 is configured to rotate about an anvil axis 38 in the direction indicated by the arrow 42 associated therewith to press the substrate web 22 against the bonding surface 34 of the bonding roll 28 thereby bonding the substrate web 22. The outer peripheral bonding surface 34 of bonding roll 28 is contacted by at least three support surfaces 44. The support surfaces 44 are spaced around the outer peripheral bonding surface 34 of the bonding roll 28 to maintain the bonding roll 28 in a substantially fixed position. An adjusting mechanism 46 is configured to contact the top surface of the bonding roll 28 with support surface 44. In addition a support surface loading device 74 is provided to retract at least one of the supporting surfaces 44 from contact with the outer peripheral bonding surface 34 of bonding roll 28. A linear slide 78 and linkage arms 80 are configured to ensure that the lower support surfaces 44 move an equal amount when retracted and reengaged.

As representatively illustrated in FIGS. 1 and 2 the bonding roll 28 is mounted above the anvil roll 36. Alternatively, the anvil roll 36 could be located above the bonding roll 28. In this arrangement a support surface loading device 74 may be provided to retract at least one of the supporting surfaces 44 from contact with the outer peripheral bonding surface 34 of bonding roll 28.

The substrate webs 22 and 48 may be provided by any materials known to those skilled in the art which are compatible with the described mechanisms such as bonding. For example, the substrate webs 22 and 48 may include a nonwoven material such as a spunbond, meltblown, spun laced or carded polymeric material, a film material such as a polyolefin or polyurethane film, a foam material or combinations thereof. For the purposes of the present description, the term "nonwoven web" shall mean a web of material that is formed without the aid of a textile weaving or knitting process. The substrate webs 22 and 48 may also be elastic or nonelastic such as films or layers of natural rubber, synthetic rubber or thermoplastic elastomeric polymers. As used herein, the terms "elastomeric" or "elastic" refer to any material that, upon application of a biasing force, is capable of being elongated or stretched in a specified direction from at least about 20 percent to about 400 percent and which will recover to within at least from about 5 to about 35 percent of its original length after being elongated or stretched. The substrate webs 22 and 48 may be the same material or may be different materials. In a specific aspect, at least one of the substrate webs is formed from an elastomeric material such as a stretch-bonded-laminate (SBL) material, a neck-bonded-laminate (NBL) material, an elastomeric film, an elastomeric foam material, or the like as are well known to those skilled in the art.

It should be apparent that adequate bonding can be achieved by a variety of mechanisms. For example, the bond can result from the partial or complete melting of the substrate webs 22 and 48. The bond can also result from the partial or complete melting of only one of the substrate webs 22 and 48 with the melted material flowing onto the adjacent substrate web which in turn results in the mechanical interlocking of the substrate webs to each other. The substrate webs 22 and 48 may be melted and bonded by any means known to those skilled in the art, such as, for example, thermally or ultrasonically. Alternatively, the substrate webs 22 and 48 may be adhesively bonded together by applying an adhesive to at least one of the substrate webs before the webs are pressed together using the apparatus and method of the present invention.

As representatively illustrated in FIGS. 1 and 2, the bonding roll 28 is configured to rotate about the bonding axis 30 in the direction indicated by the arrow 32 associated therewith. The bonding roll 28 can be connected to a shaft by suitable means such as by using welds, bolts, screws, a matching key and keyway and the like. The other rotating components of the apparatus 20 may also be connected using similar means. The bonding roll 28 and shaft may then be rotatably mounted and connected to a frame support by suitable means such as, for example, conventional bearings. Typically, the bonding roll 28 is driven by any means known to those skilled in the art such as, for example, an electric motor. The bonding roll 28 can be made from any material that is capable of withstanding the force exerted by the anvil roll 36. Desirably, the bonding roll is made from steel for thermal bonding or titanium for ultrasonic bonding. In one aspect, the bonding roll 28 can be heated and configured to thermally bond the substrate webs 22 and 48 together.

Figure 3:
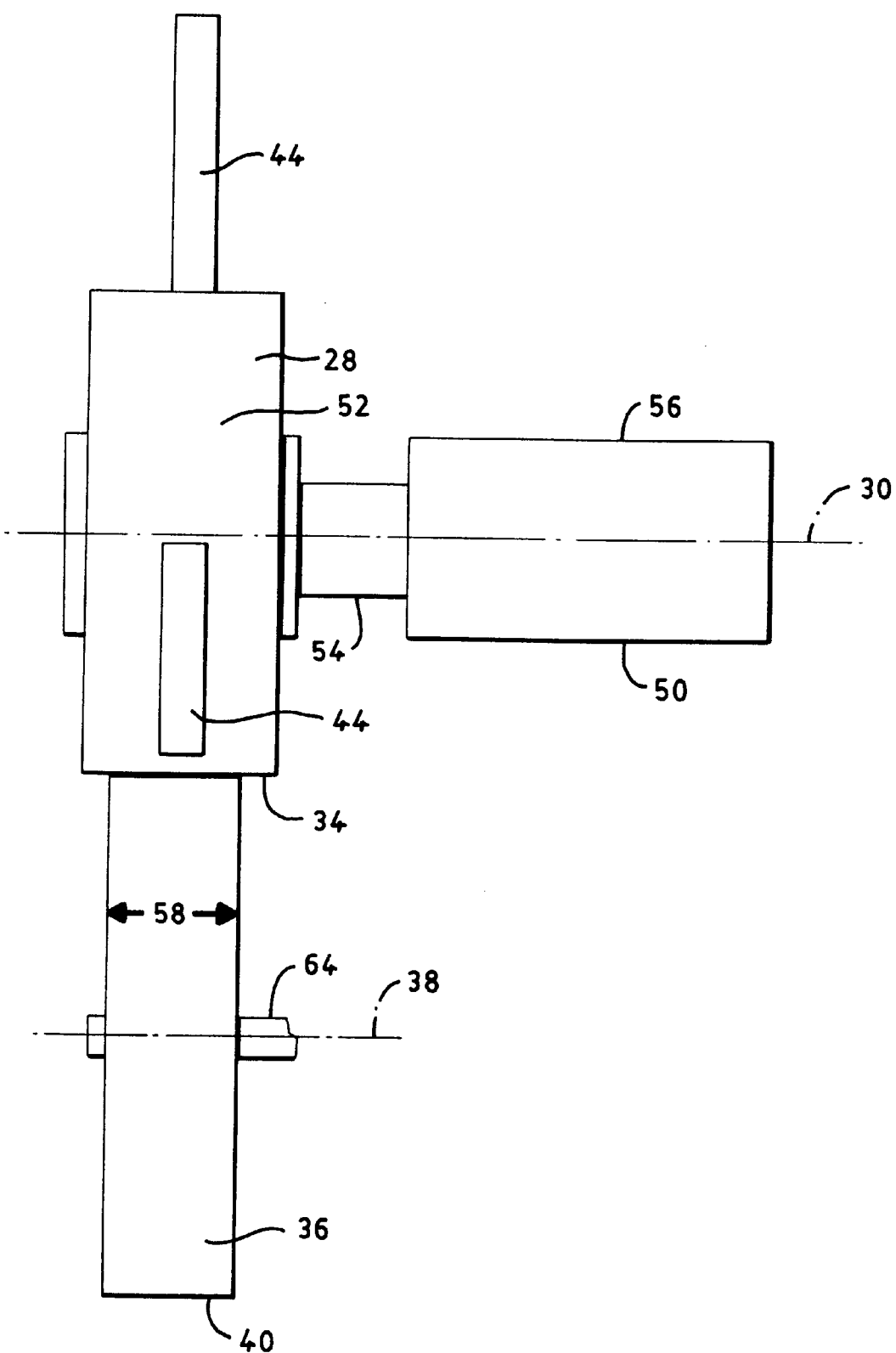
FIG. 3 representatively shows a side elevational view of the apparatus illustrated in FIG.1.

In a particular aspect of the invention, the continuously moving substrate webs 22 and 48 are melted ultrasonically using a rotary ultrasonic horn and bonded together. For example, as representatively illustrated in FIG. 3, the bonding roll 28 can include an ultrasonic bonding mechanism 50 which can include a rotary ultrasonic horn 52. In such a configuration, the anvil roll 36 is configured to rotate about the anvil axis to press the substrate webs 22 and 48 against the outer peripheral bonding surface 34 of the rotary ultrasonic horn 52 thereby bonding the substrate webs together. As illustrated in FIG. 3, the support surfaces 44 are configured to contact the peripheral bonding surface 34 of the rotary ultrasonic horn 52 to hold the rotary ultrasonic horn 52 in a substantially fixed position.

Alternatively, the anvil roll 36 can include the ultrasonic bonding means 50 and rotary ultrasonic horn 52. In such a configuration, the rotary ultrasonic horn presses the substrate webs 22 and 48 against the bonding surface 34 of the bonding roll 28 and the support surfaces 44 contact the outer peripheral bonding surface 34 of the bonding roll 28 to hold the bonding roll 28 in a substantially fixed position.

As representatively illustrated in FIG. 3, the rotary ultrasonic horn 52 of the different aspects of the present invention includes a shaped, metal object. Representative examples of rotary ultrasonic horns which can be used in the present invention are described in commonly assigned U.S. Pat. No. 5,096,532 to Neuwirth et al. and U.S. Pat. No. 5,110,403 to Ehlert, which are herein incorporated by reference. In general, the rotary ultrasonic horn 52 may be made from any metal having suitable acoustical and mechanical properties. Suitable metals include aluminum, monel, titanium and some alloy steels. In general, variables such as the diameter, mass, width, thickness and configuration of the rotary ultrasonic horn 52 are not critical. However, the variables do determine the particular frequency and amplitude at which the rotary ultrasonic horn 52 resonates and vibrates, which can affect bond quality and consistency. In particular, the diameter, width and thickness of the horn are selected such that the horn, upon being excited by ultrasonic energy at a desired frequency, is adapted to resonate such that the excited end moves substantially in phase with the movement of the source of excitation and the opposed end and bonding surface 34 move substantially out of phase with the excited end. Thus, upon subjecting the horn 52 to ultrasonic excitation, the excited end moves in a direction to wards the interior of the horn while the opposing end and the bonding surface 34 move in the opposite direction that is also towards the interior of the horn. As such, the movements of the ends of the horn relative to each other are said to be out of phase.

For example, the rotary ultrasonic horn 52 in the illustrated embodiments may be excited at a frequency of from about 18 to about 60 kHz. The horn 52 may also have a diameter of from about 4 to about 20 centimeters and a width at the bonding surface 34 of from about 0.6 to about 13 centimeters. The thickness of the horn at the rotational axis may also be from about 0.06 to about 15 centimeters. The horn may have a mass in the range of from about 0.06 to about 30 kilograms.

The ultrasonic bonding mechanism 50 also includes a drive mechanism 56 to rotate and ultrasonically excite the rotary ultrasonic horn 52. Any mechanism that provides the desired rotation and excitation can be used in the present invention. Such mechanisms are well known to those skilled in the art. For example, the ultrasonic bonding means 50 may include a drive mechanism 56 which is commercially available from Dukane Corporation located in St. Charles, Ill. or a similar system available from Branson Sonic Power Company located in Danbury, Conn. Typically, a generator, such as a Dukane 1800 watt, 20 kHz generator (Part No. 20A1800), is connected to a driver assembly, such as a Dukane driver assembly (Part No. 110-3123), to provide the necessary ultrasonic excitation. Any combination of boosters, such as a Dukane 1:1 booster (Part No. 2177T) and a Dukane 2:1 booster (Part No. 2181T), may then be attached to the driver assembly. Finally, the rotary ultrasonic horn 52 of the present invention is attached to the boosters. Thus, the combination of the generator, drive assembly and boosters ultrasonically excites the rotary ultrasonic horn 52 thereby providing the ultrasonic energy necessary to bond the substrate webs 22 and 48 together.

As representatively illustrated in FIGS. 1–3, the anvil roll 36 is configured to rotate about the anvil axis 38 and press the substrate webs 22 and 48 against the bonding surface 34 of the bonding roll 28, thereby bonding the substrate webs together. The anvil roll 36 is connected to a shaft 64 that is rotatably mounted and connected to the frame 66 by any suitable means, such as conventional bearings. In general, the anvil roll 36 may be made from any metal having suitable mechanical properties. Suitable metals include alloy steels.

Typically, the anvil roll has an anvil surface 40 and an anvil width 58 of from about 1 to about 15 centimeters and desirably from about 3 to about 15 centimeters. The anvil surface 40 is configured to bond the substrate webs 22 and 48 together at bond locations that are arranged in a predetermined bond pattern. For example, as representatively illustrated in FIG. 4A, the anvil surface 40 of the anvil roll 36 may have a plurality of projections 60 thereon. The projections 60 may extend completely across the anvil surface 40 of the anvil roll 36 or, in the alternative, may be disposed on only a portion of the anvil surface 40. The projections 60 of the anvil roll 36 press the substrate webs 22 and 48 against the bonding roll 28 to bond the substrate webs 22 and 48 together at bond locations. As representatively illustrated in FIG. 4A, the projections 60 of the anvil roll 36 can be configured such that the substrate webs 22 and 48 are bonded together at bond locations that are arranged in a predetermined bond pattern. The projections 60 may be of any shape or size depending upon the desired bonding configuration. The bonding surface 34 of the bonding roll 28 may also have a plurality of projections 60 thereon.

In a particular embodiment, the anvil surface 40 of the anvil roll 36 may have a raised portion 62 thereon as representatively illustrated in FIG. 4C. This raised portion 62 can be particularly useful when substrate webs 22 and 48 have varying thickness as illustrated in FIG. 4B. The raised portion 62 of the anvil surface 40 can be timed to press the thinner portions 68 of substrate webs 22 and 48 against the bonding surface 34 of the bonding 25 roll 28. This timing can be beneficial to maintaining a substantially constant interference between bonding surface 34 and anvil surface 40. As the process variables change, such as the thickness of the substrate webs 22 and 48, it becomes increasing difficult to maintain a consistent interference between bonding surface 34 and anvil surface 40 when using a conventional bonding roll which is mounted in a cantilevered configuration.

The present invention addresses this problem with the use of support surfaces 44. As representatively illustrated in FIGS. 1–3, the support surfaces 44 are configured to contact the bonding surface 34 of the bonding roll 28. The support surfaces 44 are spaced around the bonding surface 34 to hold the bonding roll 28 in a substantially fixed position. The support surfaces 44 may be spaced around the bonding roll 28 in any manner that maintains the bonding roll 28 in a substantially fixed position. For example, in a particular embodiment, three support surfaces 44 are equally spaced 120 degrees apart around the bonding surface 34 of the bonding roll 28. Desirably, the rolls are spaced such that less than 180 degrees of the bonding surface 34 is not supported by at least one support surface 44.

Alternatively, the anvil surface 40 of the anvil roll 36 can be contacted by support surfaces 44. The support surfaces 44 can be equally distributed around the anvil surface 40 or can be spaced such that less than 180 degrees of the anvil surface 40 is not supported by at least one surface 44.

The support surfaces 44 can be made from any suitable material capable of holding the bonding roll 28 in a substantially fixed position. These materials could include a metal such as steel, an alloy, rubber, urethane, or any other durable material. In one embodiment, the support surfaces 44 are wheels or rolls that are configured to contact the bonding surface 34 of bonding roll 28. Those skilled in the art will recognize that various objects and materials can be used as the support surfaces 44 to contact the outer bonding surface 34 of the bonding roll 28 and hold the bonding roll 28 in a substantially fixed position. Desirably, the support surfaces 44 rotate as the bonding roll rotates to more effectively support the bonding roll without adversely affecting its rotation. The support surfaces 44 may otherwise include ball bearings or idler rolls, as are known to those skilled in the art, configured to contact the bonding surface 34 of bonding roll 28.

The apparatus 20 and method of the present invention as representatively illustrated in FIGS. 1–2, may also include a support surface loading device 74 connected to at least one of the support surfaces 44 for retracting and engaging the support surfaces 44. The support surface loading device 74 can be actuated manually, pneumatically, hydraulically, or by any other suitable means. For example, suitable support surface loading devices 74 include air cylinders, hydraulic cylinders and the like. The support surface loading device 74 can also exert a force on the bonding roll 28 sufficient to overcome the flex caused by the weight of the bonding roll 28 and the cantilevered mounting. The support surface loading device 74 is actuated to retract support surfaces 44 from contact with the outer peripheral bonding surface 34 of bonding roll 28. The bonding roll 28 ceases to contact support surfaces 44 due to the flex of the bonding roll 28 and the retraction of at least one of the support surfaces 44. The support surface loading device 74 may actuate and move at least one of the support surfaces 44 into contact with the outer peripheral bonding surface 34 of bonding roll 28 with enough force to overcome the flex of the bonding roll 28 and make contact with the remaining support surfaces 44. The adjusting mechanism 46 is used to position the remaining support surface 44 to account for different bonding roll 28 diameters.

The use of the support surfaces 44 is particularly useful when the rotatable anvil roll 36 has an intermittent bond pattern 70 on the outer peripheral anvil surface 40 such as representatively illustrated in FIG. 4A. As the bond pattern 70 enters the nip 72 created between bonding surface 34 and anvil surface 40, the substrate webs 22 and 48 are pressed against the bonding roll 28 effectively intermittently bonding the substrate webs 22 and 48 together at the selected bond pattern sites. The outer bonding surface 34 of the bonding roll 28 is contacted by the support surfaces 44 to hold the bonding roll 28 in a substantially fixed position. The support surfaces 44 advantageously reduce the flex of the bonding roll 28 when the intermittent bond pattern 70 is not in the nip 72 created between the bonding surface 34 of the bonding roll 28 and the anvil surface 40 of the anvil roll 36. The support surfaces 44 hold the bonding roll 28 in a substantially fixed position, when the bond pattern 70 enters the nip 72 created between the bonding surface 34 of the bonding roll 28 and the anvil surface 40 of the anvil roll 36, the effective nip pressure is increased by reducing the deflection of the bonding roll 28. The resulting higher nip pressure improves the quality of the bond and allows for higher machine speeds.

Thus, the different aspects of the invention can more efficiently provide an apparatus and method for effecting an operation on at least one moving substrate web. The different aspects of the present invention provide more consistent bonds than conventional methods which use cantilevered bonding rolls because the bonding roll 28 is held in a substantially fixed position by at least three support surfaces 44.

While the invention has been described in detail with respect to specific aspects thereof, it will be appreciated that those skilled in the art, upon attaining an understanding of the foregoing, may readily conceive of alterations to, variations of, and equivalents to these aspects. Accordingly, the scope of the present invention should be assessed as that of the appended claims and any equivalents thereto.

What is claimed is:

1. A method for effecting an operation on at least one moving substrate web comprising the steps of:
   a) supplying said at least one moving substrate web along a substrate path;
   b) providing a rotatable function roll adjacent said substrate path which rotates about a function axis and includes an outer peripheral surface upon which said substrate web travels;
   c) contacting said outer peripheral surface of said function roll with at least three supporting surfaces to maintain said function roll in a substantially fixed position in use; and
   d) providing a rotatable anvil roll adjacent said substrate path which rotates about an anvil axis and presses said substrate web against said outer peripheral surface of said function roll thereby effecting said operation on said substrate web.

2. The method of claim 1 wherein said at least three supporting surfaces are rotatable stabilizer wheels.

3. The method of claim 1 wherein at least one of said at least three supporting surfaces is retractable.

4. The method of claim 1 wherein said supporting surfaces are spaced around said function roll such that less than 180 degrees of said outer peripheral surface of said function roll remains unsupported.

5. The method of claim 1 wherein said rotatable function roll comprises an ultrasonic bonding means which includes a rotary ultrasonic horn.

6. The method of claim 1 wherein said rotatable anvil roll comprises a plurality of projections on an outer peripheral anvil surface of said anvil roll to bond said substrate web at bond locations which are arranged in a predetermined bond pattern.

7. The method of claim 1 wherein said operation on said substrate web is effected intermittently.

8. A method for ultrasonically bonding at least one moving substrate web comprising the steps of:
   a) supplying said at least one moving substrate web along a substrate path;
   b) providing an ultrasonic bonding means for providing ultrasonic energy wherein said ultrasonic bonding means includes a rotary ultrasonic horn which rotates about a bonding axis and which has an outer peripheral bonding surface upon which said substrate web travels;
   c) contacting said outer peripheral bonding surface of said rotary ultrasonic horn with at least three supporting surfaces to maintain said rotary ultrasonic horn in a substantially fixed position in use; and
   d) providing a rotatable anvil roll adjacent said substrate path which rotates about an anvil axis and presses said substrate web against said outer peripheral bonding surface of said rotary ultrasonic horn thereby bonding said substrate web.

9. The method of claim 8 wherein said at least three supporting surfaces are rotatable stabilizer wheels.

10. The method of claim 8 wherein at least one of said at least three supporting surfaces is retractable.

11. The method of claim 8 wherein said supporting surfaces are spaced around said rotary ultrasonic horn such that less than 180 degrees of said outer peripheral bonding surface of said rotary ultrasonic horn remains unsupported.

12. The method of claim 8 wherein said rotatable anvil roll comprises a plurality of projections on an outer peripheral anvil surface of said anvil roll to bond said substrate webs together at bond locations which are arranged in a predetermined bond pattern.

13. A method for intermittently ultrasonically bonding at least one moving substrate web comprising the steps of:
   a) supplying said at least one moving substrate web along a substrate path;
   b) providing an ultrasonic bonding means for providing ultrasonic energy wherein said ultrasonic bonding means includes a rotary ultrasonic horn which rotates about a bonding axis and which has an outer peripheral bonding surface upon which said substrate web travels;
   c) contacting said outer peripheral bonding surface of said rotary ultrasonic horn with at least three supporting surfaces to maintain said rotary ultrasonic horn in a substantially fixed position in use; and
   d) providing a rotatable anvil roll adjacent said substrate path which rotates about an anvil axis, wherein said anvil roll includes a plurality of projections arranged in an intermittent pattern on an outer peripheral anvil surface which press said substrate web against said bonding surface of said rotary ultrasonic horn thereby intermittently bonding said substrate web.

14. The method of claim 13 wherein said at least three supporting surfaces are rotatable stabilizer wheels.

15. The method of claim 14 wherein at least one of said at least three supporting surfaces is retractable.

16. The method of claim 14 wherein said supporting surfaces are spaced around said rotary ultrasonic horn such that less than 180 degrees of said outer peripheral bonding surface of said rotary ultrasonic horn remains unsupported.

17. An apparatus for ultrasonically bonding at least one moving substrate web comprising:
   a) an ultrasonic bonding means for providing ultrasonic energy wherein said ultrasonic bonding means includes a rotary ultrasonic horn which is configured to rotate about a bonding axis and which has an outer peripheral bonding surface upon which said substrate web travels;
   b) at least three supporting surfaces which are configured to contact said outer peripheral bonding surface of said rotary ultrasonic horn to maintain said rotary ultrasonic horn in a substantially fixed position in use; and
   c) a rotatable anvil roll which has an outer peripheral anvil surface and which is configured to rotate about an anvil axis and press said substrate web against said bonding surface of said rotary ultrasonic horn thereby bonding said substrate web.

18. The apparatus of claim 17 wherein said rotatable anvil roll has a plurality of projections on said outer peripheral anvil surface which are configured to bond said substrate web at bond locations which are arranged in a predetermined bond pattern.

19. The apparatus of claim 18 wherein said at least three support surfaces are rotatable stabilizer wheels.

20. The apparatus of claim 18 wherein said supporting surfaces are spaced around said rotary ultrasonic horn such that less than 180 degrees of said outer peripheral surface of said rotary ultrasonic horn remains unsupported.

21. The apparatus of claim 18 wherein said stabilizer wheels are connected to a support frame that comprises a loading means for retracting at least one of said support surfaces.

22. The apparatus of claim 21 wherein said loading means is a hydraulic cylinder.

23. The apparatus of claim 22 wherein said loading means is a pneumatic cylinder.

\* \* \* \* \*